US008028569B2

(12) United States Patent
Blumendeller et al.

(10) Patent No.: US 8,028,569 B2
(45) Date of Patent: Oct. 4, 2011

(54) METHOD AND DEVICE FOR ADAPTING THE EFFICIENCY OF A COOLER IN THE RETURN CIRCUIT OF EXHAUST GAS IN AN INTERNAL COMBUSTION ENGINE

(75) Inventors: Wilhelm Blumendeller, Freiberg (DE); Horst Mueller, Nordheim (DE)

(73) Assignee: Robert Bosch GmbH, Stuttgart (DE)

(*) Notice: Subject to any disclaimer, the term of this patent is extended or adjusted under 35 U.S.C. 154(b) by 177 days.

(21) Appl. No.: 12/339,428

(22) Filed: Dec. 19, 2008

(65) Prior Publication Data

US 2009/0266151 A1 Oct. 29, 2009

(30) Foreign Application Priority Data

Apr. 28, 2008 (DE) ........................ 10 2008 001 418

(51) Int. Cl.
*G01M 15/10* (2006.01)

(52) U.S. Cl. ................................ 73/114.74; 73/114.68

(58) Field of Classification Search ............... 73/114.68, 73/114.74

See application file for complete search history.

(56) References Cited

U.S. PATENT DOCUMENTS

| | | | | |
|---|---|---|---|---|
| 6,085,732 | A * | 7/2000 | Wang et al. | 123/568.12 |
| 6,848,434 | B2 * | 2/2005 | Li et al. | 123/568.12 |
| 7,155,332 | B2 * | 12/2006 | Yamada et al. | 701/108 |
| 7,165,540 | B2 * | 1/2007 | Brookshire et al. | 123/568.12 |
| 7,222,615 | B2 * | 5/2007 | Buck et al. | 123/568.12 |
| 7,260,468 | B2 * | 8/2007 | Durand et al. | 701/101 |
| 7,409,928 | B2 * | 8/2008 | Rizoulis et al. | 123/41.01 |
| 7,461,641 | B1 * | 12/2008 | Styles et al. | 123/568.12 |
| 7,591,135 | B2 * | 9/2009 | Stewart | 60/600 |
| 7,631,552 | B2 * | 12/2009 | Keski-Hynnila et al. | 73/114.74 |
| 2009/0038593 | A1 * | 2/2009 | Blumendeller | 123/568.12 |
| 2009/0158706 | A1 * | 6/2009 | Sun | 60/274 |
| 2009/0293600 | A1 * | 12/2009 | Coppola et al. | 73/114.68 |
| 2010/0043525 | A1 * | 2/2010 | Recouvreur et al. | 73/23.31 |

* cited by examiner

*Primary Examiner* — Freddie Kirkland, III
(74) *Attorney, Agent, or Firm* — Kenyon & Kenyon LLP

(57) ABSTRACT

A method for providing a specification about an efficiency of a cooler for recirculated exhaust gas in an internal combustion engine includes: measuring a temperature of the recirculated exhaust gas cooled by the cooler; and ascertaining the specification about the efficiency of the cooler as a function of the measured temperature of the cooled recirculated exhaust gas. With the aid of the specification about the efficiency of the cooler it is possible to determine a failure of the cooler or to calculate a temperature of the recirculated exhaust gas in order implement an engine control system of the internal combustion engine on the basis of a reliable temperature specification that is not influenced by lag effects.

19 Claims, 4 Drawing Sheets

METHOD AND DEVICE FOR ADAPTING THE EFFICIENCY OF A COOLER IN THE RETURN CIRCUIT OF EXHAUST GAS IN AN INTERNAL COMBUSTION ENGINE

CROSS-REFERENCE TO RELATED APPLICATIONS

The present application claims priority to Application No. 10 2008 001 418.4, filed in the Federal Republic of Germany on Apr. 28, 2008, which is expressly incorporated herein in its entirety by reference thereto.

FIELD OF THE INVENTION

The present invention relates to engine systems for internal combustion engines having an exhaust gas recirculation system, which have a cooler in the exhaust gas recirculation segment for cooling the recirculated exhaust gas.

BACKGROUND INFORMATION

In engine systems for internal combustion engines, exhaust gas is recirculated in order to reduce the nitrogen oxide component of the exhaust gas. Due to the increased soot component in the exhaust gas brought about by the exhaust gas recirculation, the quantity of recirculated exhaust gas (indicated by the exhaust gas recirculation rate: EGR rate) is limited with the aid of a constant exhaust gas recirculation rate as a compromise between the nitrogen oxide component and the soot component in the exhaust gas.

The recirculated exhaust gas is normally conducted through a cooler (EGR cooler) for cooling. Cooling the recirculated exhaust gas allows for a higher EGR rate at a constant intake manifold pressure and may thus have a significant influence on minimizing raw emissions.

Modern control arrangements such as, e.g., the model-based charge control (MCC) make it possible to control the EGR rate and have the advantage over conventional air mass controllers of being able to keep the emissions of the internal combustion engine in narrower tolerances. The required control variable of the EGR rate is generally calculated with the aid of an air system model which assumes the model of an intact, ideal cooler for modeling the temperature of the cooled exhaust gas.

The efficiency of the EGR cooler, however, may change while the internal combustion engine is in operation such that the cooling performance varies. Due to the changed density of the recirculated exhaust gas, the variation of the cooling performance results in a change of the EGR rate and may thus result in a significant fluctuation of the emission of the internal combustion engine.

Furthermore, because the cooler for cooling the recirculated exhaust gas (EGR cooler) is relevant in terms of emissions, the law requires that the cooling function be monitored in connection with the on-board diagnosis.

SUMMARY

Example embodiments of the present invention provide a method for determining an efficiency specification of an EGR cooler.

Example embodiments of the present invention detect a malfunction of the EGR cooler.

Example embodiments of the present invention provide an EGR rate control such that the fluctuations of the nitrogen oxide emissions are reduced.

According to example embodiments of the present invention, a method is provided for furnishing a specification about an efficiency of a cooler for recirculated exhaust gas in an internal combustion engine. The method includes the following: measuring a temperature of the recirculated exhaust gas cooled by the cooler; and ascertaining the specification about the efficiency of the cooler as a function of the measured temperature of the cooled recirculated exhaust gas.

An absolute value of the efficiency may be ascertained as the specification about the efficiency of the cooler. Alternatively, the specification about the efficiency of the cooler may also be ascertained as a specification about a change in the efficiency of the cooler with respect to a reference efficiency of the reference cooler and furthermore as a function of the cooler model temperature, the cooler model temperature of the cooled recirculated exhaust gas being determined according to a cooler model for a reference cooler as a function of a mass flow of the recirculated exhaust gas.

According to example embodiments of the present invention, a method for detecting a failure of the cooler is provided, a specification about the efficiency of a cooler being ascertained in accordance with the above method, the failure of the cooler being determined as a function of a threshold value.

A method for operating an internal combustion engine may be provided, in which an engine control system setting an exhaust gas recirculation rate for the internal combustion engine as a function of a provided temperature of the cooled recirculated exhaust gas, the provided temperature of the cooled recirculated exhaust gas being determined as a function of the specification about the efficiency of the cooler, which is ascertained in accordance with the above method.

Example embodiments of the present invention provide a method for determining a specification about an efficiency of an EGR cooler, e.g., a specification about an absolute efficiency or a change in the efficiency of the cooler such that with the aid of the specification about the efficiency it is possible to detect a failure of the EGR cooler. Furthermore, an engine control system may be operated as a function of the temperature of the recirculated exhaust gas, the temperature of the recirculated exhaust gas being provided, not by the temperature measured by a temperature detector in the recirculation line, but rather by a temperature calculated from the specification about the efficiency.

Furthermore, the efficiency of an intact cooler may also change within certain limits, and it thus affects the temperature of the exhaust gas behind the EGR cooler and thus the EGR rate. The change in the efficiency is caused, for example, by soot deposits in the EGR cooler. Such soot deposits, however, may again dissipate during certain operating phases such that changes of the cooler efficiency result over the life of a vehicle. While, in current air system models, a constant, permanently specified cooler model is always assumed, example embodiments of the present invention provide for the monitoring function to correct or adapt the cooler model by the calculated change in efficiency $\Delta\eta_{cooler}$, or based on the absolute efficiency $\eta_{cooler}$. The adaptation preferably occurs only in small steps. This is sensible because changes in the efficiency of the cooler may also be observed only over longer time periods. This measure results in a qualitatively better modeled temperature of the recirculated exhaust gas behind the EGR cooler and thus also to a more precise calculation of the EGR rate. Additionally, the adaptation of the cooler efficiency ensures that the quality of the dynamics of the temperature specification, which is calculated via the efficiency, is good, in contrast to the dynamics of the temperature detector.

Furthermore, the specification about the efficiency may be low-pass filtered. In particular, the time constant of the low-pass filtering may be performed as a function of an enabling time, the enabling time indicating the total time during which one or more enabling conditions are satisfied.

According to example embodiments, the specification about the efficiency may be ascertained as a function of one or more enabling conditions. The enabling conditions may include: the exhaust gas temperature exceeds a certain predetermined exhaust gas threshold temperature; an exhaust gas mass flow of the recirculated exhaust gas exceeds a certain predetermined exhaust gas mass flow threshold value; and the EGR rate exceeds a certain predetermined EGR rate threshold value.

Furthermore, if the specification about the efficiency of the cooler is ascertained as the specification about a change in the efficiency of the cooler with respect to a reference efficiency, then it is possible to determine the threshold value as a function of an exhaust gas mass flow through the cooler in accordance with a cooler model.

The cooler model is able to describe a correlation between the efficiency of the cooler and the exhaust gas mass flow through the cooler, the cooler model being adapted as a function of an ascertained efficiency of the cooler in a particular exhaust gas mass flow. In particular it is possible to perform the adaptation of the cooler model by interpolation as a function of a cooler model of the reference cooler and a cooler model of a suppressed cooler.

According to example embodiments, an engine control unit is provided for furnishing a specification about an efficiency of a cooler for recirculated exhaust gas in an internal combustion engine. The engine control unit is arranged: to receive a specification about a temperature of the recirculated exhaust gas cooled by the cooler; and to ascertain the specification about the efficiency of the cooler as a function of the temperature of the cooled recirculated exhaust gas.

According to example embodiments, the engine control unit may be provided for detecting a failure of the cooler; the engine control unit being adapted to ascertain a specification about the efficiency of a cooler according to the above method and to determine a failure of the cooler as a function of a threshold value.

According to another aspect, a computer program product is provided having program code for carrying out the above method when the program is executed in an engine control unit.

Example embodiments of the present invention are explained in greater detail in the following text on the basis of the attached drawings.

DETAILED DESCRIPTION

Figure 1:
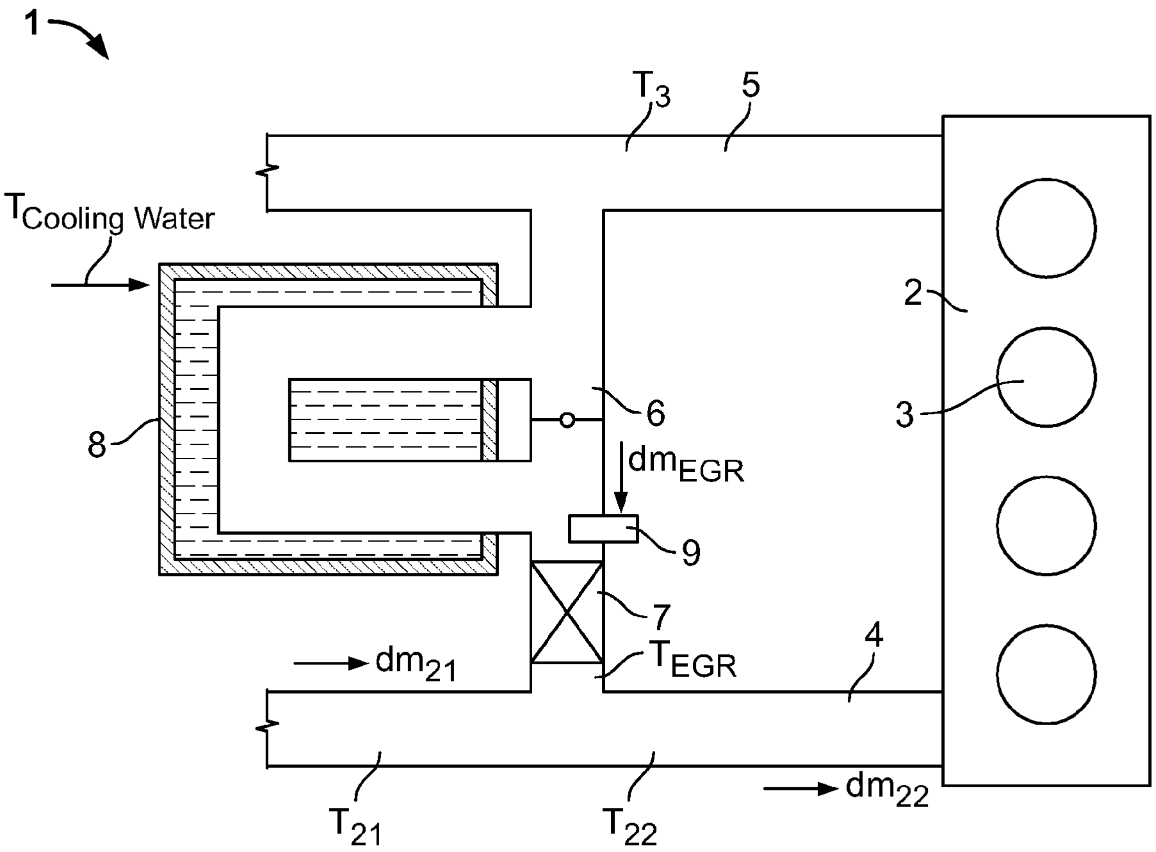
FIG. 1 is a schematic representation of an engine system having an exhaust gas recirculation system.

FIG. 1 shows a schematic representation of an engine system 1 having an internal combustion engine 2 that has four cylinders 3. Via corresponding intake valves (not shown), an air supply 4, e.g. in the form of an intake manifold, supplies air, required for the combustion, to cylinders 3 of internal combustion engine 2. The exhaust gas produced by the combustion in cylinders 3 is removed from internal combustion engine 2 via an exhaust branch 5.

Between exhaust branch 5 and supply 4, an exhaust gas recirculation line 6 is provided, which has an exhaust gas recirculation valve 7 (EGR valve) in order to feed a portion of the exhaust gas removed through exhaust branch 5 into supply 4. EGR valve 7 is variably adjustable in order to implement a desired exhaust gas recirculation rate (EGR rate) in engine system 1. The EGR rate is defined as the ratio between the exhaust gas mass flow $m_{EGR}$ through recirculation line 6 and the total mass flow $m_{22}$ of the gas quantity flowing into cylinders 3 of internal combustion engine 2. The gas quantity flowing into cylinders 3 is determined by the sum of the air mass flow $m_{21}$ drawn in by internal combustion engine 2 and the recirculated exhaust gas flow $m_{EGR}$.

Exhaust gas is recirculated into air supply 4 so as to reduce the nitrogen oxide produced by the combustion in cylinders 3. The EGR rate is controlled to be substantially constant in accordance with an exhaust gas recirculation control system that controls EGR valve 7 as a function of exhaust gas values, combustion and/or operating parameters of internal combustion engine 3. In addition to the aspirated air mass flow $m_{21}$, the exhaust gas recirculation control system also takes the temperature $T_{EGR}$ of the recirculated exhaust gas (EGR temperature) into account since the latter affects the density of the exhaust gas. In this regard, it is particularly desirable to reduce the temperature of the exhaust gas such that the desired EGR rate, determined by the exhaust gas recirculation control system, may be increased without reducing the aspirated air mass flow $m_{21}$.

Therefore, an exhaust gas cooler 8 (EGR cooler) is provided between exhaust branch 5 and EGR valve 7. EGR cooler 8 cools the exhaust gas flowing through recirculation line 6 with the aid of cooling water or the like. Temperature $T_{EGR}$ of the cooled recirculated exhaust gas is measured with the aid of a temperature detector 9 situated between EGR cooler 8 and EGR valve 7. Furthermore, the temperature of the exhaust gas flowing into EGR cooler 8 is indicated by $T_3$, and the temperature of the cooling water used for cooling in EGR cooler 8 is indicated by $T_{cooling\ water}$. The temperature $T_{cooling\ water}$ of the cooling water may be ascertained e.g. using a suitable cooling water temperature detector (not shown).

After leaving internal combustion engine 3, exhaust gas temperature $T_3$ of the exhaust gas is measured either by another temperature detector (not shown) or is determined according to a model from operating parameters such as injection quantity, the temperature of the mass flow taken into cylinders 3 via the intake valves and other operating parameters such as e.g. rotational speed, load torque, ignition timing, etc., in accordance with a characteristics map or an underlying function of an engine model.

$$T_3=f(T_{22},\text{injection quantity,etc.})$$

where $T_{22}$ corresponds to the temperature of the gas (air, exhaust gas) fed into the internal combustion engine, which results from the temperature $T_{21}$ of the air aspirated from the surroundings, the EGR temperature $T_{EGR}$ and the EGR rate.

Figure 2:
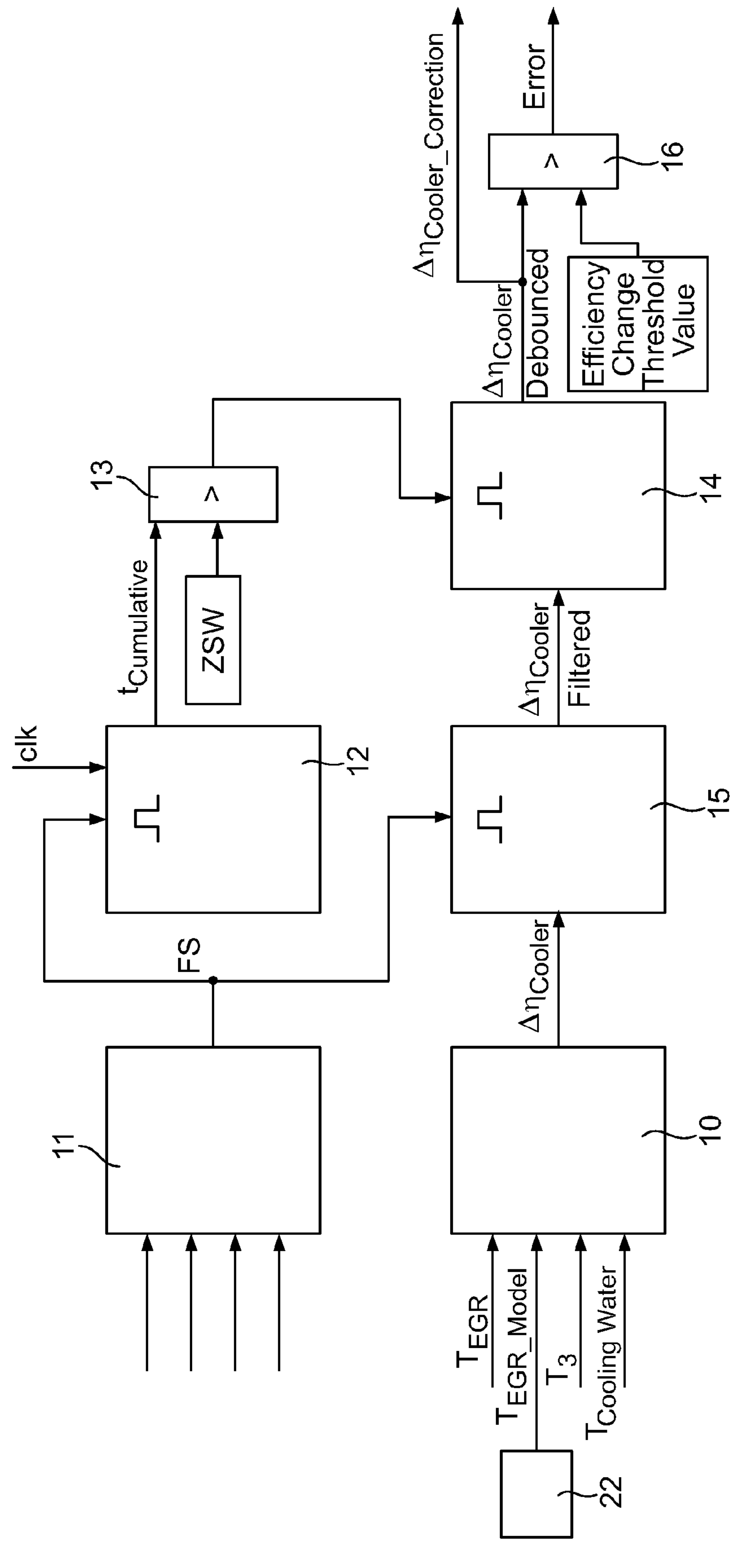
FIG. 2 is a schematic block diagram for representing a method for monitoring the function of the EGR cooler and for providing an efficiency correction value.

FIG. 2 shows a block diagram for representing a function for ascertaining an efficiency correction value $\Delta\eta_{cooler\_correction}$ and for establishing a failure of EGR cooler 8 schematically in a block diagram.

In an efficiency change calculation unit 10, a change in efficiency $\Delta\eta_{cooler}$ is calculated as a function of the EGR temperature $T_{EGR}$, which is measured by temperature detector 9, as a function of a modeled temperature specification of the temperature value $T_{EGR\ model}$ obtaining at the position of temperature detector 9 when EGR cooler 8 is intact, as a function of a temperature specification of the exhaust gas when leaving internal combustion engine 2 and as a function of the temperature of the cooling water $T_{cooling\ water}$, in accordance with the following formula:

$$\Delta\eta_{cooler} = \frac{T_{EGR} - T_{EGRmodel}}{T_3 - T_{cooling\ water}}$$

The temperature value $T_{EGR\_model}$ obtaining in an intact EGR cooler 8 is provided by a cooler model 22.

Enabling conditions are checked in an enabling unit 11 and an enabling signal FS is generated if the enabling conditions obtain. The enabling conditions may include, for example, that the calculation of the change in efficiency of EGR cooler 8 is taken into account only if the temperature of exhaust gas $T_3$ exceeds a certain predetermined exhaust gas threshold temperature $T_{3\_sw}$. Furthermore, one of the enabling conditions may be that the efficiency change calculation is performed only in the case of a sufficiently great exhaust gas mass flow $dm_{EGR}$ through recirculation line 6 since otherwise the temperature $T_{EGR}$ measured by temperature detector 9 does not allow for a sufficiently precise conclusion regarding the actual cooling power of EGR cooler 8. Consequently, the exhaust gas mass flow $dm_{EGR}$ flowing through recirculation line 6 is compared to a mass flow threshold value $dm_{EGR\_SW}$ or the EGR rate is compared to an EGR rate threshold value and enabling signal FS is activated only if the exhaust gas mass flow exceeds the mass flow threshold value or the EGR rate exceeds the EGR rate threshold value. Additional enabling conditions are conceivable as well. Generally, the enabling conditions are to ensure that the ascertained efficiency change $\Delta\eta_{cooler}$ is taken into further consideration only if it is ensured with sufficient reliability that the deviation from the efficiency $\eta_{cooler}$ of an intact cooler may be detected reliably and with a low error susceptibility.

When enabling signal FS is activated, a counter is continuously incremented in a counter unit 12 as a function of a counting pulse clk, which thus specifies a total time $t_{cumulative}$, during which enabling signal FS is activated. The counter value of counter unit 12 is compared in a comparator unit 13 to a counter threshold value ZSW and an output of comparator unit 13 is relayed to a debouncing unit 14. The output of comparator unit 13 thus indicates by a logical level when the enabling conditions were/are satisfied for a minimum time period indicated by counter threshold value ZSW.

Calculated efficiency change $\Delta\eta_{cooler}$ is supplied to a low-pass filter 15, the filter output value of low-pass filter 15 being calculated only if enabling signal FS indicates that the enabling conditions obtain, that is, only in favorable operating conditions of internal combustion engine 2. A high filter time constant in the range of several seconds, minutes or even hours increases the robustness of the calculation such that even changes in the dynamics of temperature detector 9, e.g. by soot deposits, have only a small effect on the resulting filtered efficiency change $\Delta\eta_{cooler\_filtered}$.

If the total period of time, during which the enabling signal is activated, has exceeded the period of time indicated by counter threshold value ZSW, then the filtered efficiency change $\Delta\eta_{cooler\_filtered}$, which is supplied to debouncing unit 14, is applied as a debounced efficiency change $\Delta\eta_{cooler\_debounced}$ to an additional comparator unit 16. In the additional comparison unit 16, the debounced efficiency change is compared to an efficiency change threshold value WGDS and an error is determined if the efficiency change is greater than efficiency change threshold value WGDS. This establishes that the efficiency of EGR cooler 8 has changed by more than a certain amount, whereby a defect of EGR cooler 8 may be detected.

To implement an engine control system, a specification about the exhaust gas recirculation rate (EGR rate) is normally required. Since the EGR rate, however, depends heavily on the temperature of the recirculated exhaust gas, a specification about the current temperature $T_{EGR}$ of the recirculated exhaust gas must be provided. The behavior of temperature detector 9, however, is slow and hence not suited for this purpose. Example embodiments of the present invention therefore provide for the temperature $T_{EGR}$ of the recirculated exhaust gas to be derived from the exhaust gas temperature and the efficiency of EGR cooler 8 at a certain mass flow.

Since the efficiency $\eta_{cooler}$ of EGR cooler 8 may change during the life of engine system 1, it is sensible to adapt the cooler model for modeling the temperature $T_{EGR}$ of the cooled recirculated exhaust gas. Starting from a conventional cooler model 20, which ascertains a temperature specification for the temperature $T_{EGR\_model}$ of the recirculated cooled exhaust gas as a function of the exhaust gas temperature $T_3$, the cooling water temperature $T_{cooling\ water}$ and the efficiency $\eta_{cooler\_intact}$ of intact EGR cooler 8 (a reference cooler), and ascertains as a function of the efficiency change $\Delta\eta_{cooler}$ or the debounced efficiency change $\Delta\eta_{cooler\_debounced}$ ascertained in efficiency change unit 10. The temperature $T_{EGR}$ of the cooled recirculated exhaust gas, which was used so far by the exhaust gas recirculation control system, may be adapted as a function of the efficiency change $\Delta\eta_{cooler}$ or the debounced efficiency change $\Delta\eta_{cooler\_debounced}$, ascertained in efficiency change calculation unit 10, as an efficiency change correction value $\Delta\eta_{cooler\_correction}$ and as a function of modeled temperature specification $T_{EGR\_model}$ as well as exhaust gas temperature T3 and cooling water temperature $T_{cooling\ water}$.

In adaptation block 21, the adapted temperature $T_{EGR\_adapted}$ behind EGR cooler 8 is ascertained as a function of the ascertained efficiency change $\Delta\eta_{cooler\_correction}$ according to the following formula:

$$T_{EGR\_adapted} = T_{EGR\_model} + \Delta\eta^*(T_3 - T_{cooling\ water})$$

In adaptation unit 21, additional measures may be applied such as e.g. a maximum limitation of efficiency change $\Delta\eta$ or the definition of a learning rate, as are sufficiently known for adaptation methods.

Figure 3:
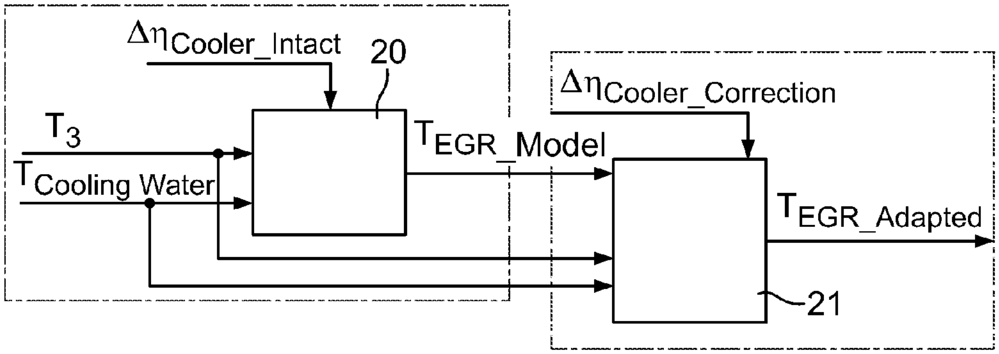
FIG. 3 is a schematic representation that illustrates the adaptation of the conventional cooler model by an ascertained change in the efficiency of the EGR cooler.

The adaptation method shown in FIG. 3 makes it possible to obtain a current value of recirculated cooled exhaust gas $T_{EGR\_adapted}$, which in contrast to the temperature specification obtained from temperature detectors 9 represents a current value of the temperature of the recirculated exhaust gas. A time delay of the temperature value due to the lag of temperature detector 9 may thus be avoided such that the exhaust gas recirculation control system is able to react more quickly to temperature changes in the recirculated exhaust gas so as to set the EGR rate to the desired value.

Figure 4:
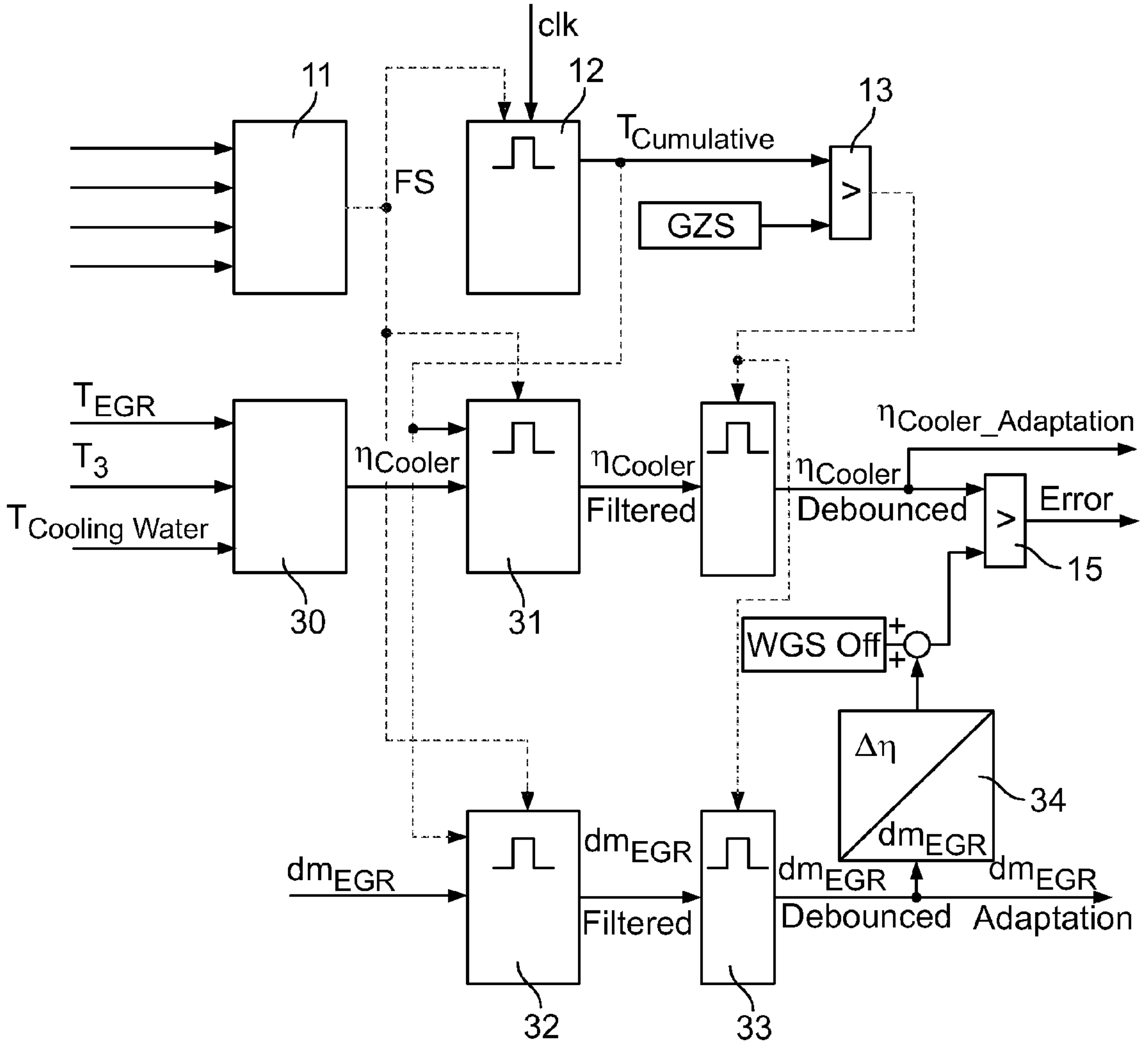
FIG. 4 is a schematic representation of a method for monitoring the function of an EGR cooler on the basis of an ascertained absolute efficiency of the EGR cooler.

FIG. 4 shows a schematic representation of the method according to example embodiments of the present invention for monitoring the EGR cooler. In comparison to the example embodiment of FIG. 2, enabling unit 11, counter unit 12 and first comparator unit 13 are developed identically.

An efficiency calculation unit 30 calculates an efficiency $\eta_{cooler}$ of the cooler from the temperature specification of temperature detector $T_{EGR}$, from exhaust gas temperature $T_3$ and from cooling water temperature $T_{cooling\ water}$ according to the following formula:

$$\eta_{cooler} = \frac{T_3 - T_{EGR}}{T_3 - T_{cooling\ water}}$$

Efficiency $\eta_{cooler}$ is supplied to a filter unit 31, which low-pass filters efficiency $\eta_{cooler}$. Efficiency $\eta_{cooler}$ is provided permanently. The filtered efficiency of the cooler $\eta_{cooler\_filtered}$, however, is only calculated if the enabling conditions obtain in accordance with enabling signal FS (see specific embodiment of FIG. 2). Furthermore, filter unit 31 receives the cumulative total enabling time $t_{cumulative}$ as the output of counter unit 12. Total enabling time $t_{cumulative}$ may then correspond to the filter time constant or be a function of it. This results in the formation of an average of the absolute efficiency. This increases the robustness of the calculation such that even changes in the dynamics of temperature detector 9, e.g. by soot deposits, or different dynamics of temperature detector 9 and the engine model for calculating exhaust gas temperature $T_3$ only have a small influence on the result. The filtering of efficiency $\eta_{cooler}$ is described by the following equation:

$$\eta_{cooler\_filtered} = \frac{\int \eta_{cooler} dT}{t_{cumulative}}$$

Efficiency $\eta_{cooler}$ is integrated during the total enabling time $t_{cumulative}$ and is divided by cumulative total enabling time $t_{cumulative}$.

In addition to the example embodiment of FIG. 2, in the example embodiment of FIG. 4, exhaust gas mass flow $dm_{EGR}$ through recirculation line 6 is filtered in that it is integrated during total enabling time $t_{cumulative}$ and is divided by total enabling time $t_{cumulative}$ so as to form the average of the efficiency. The filtering occurs according to the following equation:

$$dm_{EGR\_filtered} = \frac{\int dm_{EGR} dT}{t_{cumulative}}$$

Exhaust gas mass flow $dm_{EGR}$ is filtered in mass flow filter 32. If cumulative total enabling time $t_{cumulative}$ has exceeded a total enabling time threshold value GZS (determined by first comparator unit 13), then filtered efficiency $\eta_{cooler\_filtered}$ of the cooler and exhaust gas mass flow $dm_{EGR\_filtered}$ are provided as debounced variables via debouncing units 14 and another debouncing unit 33 for debouncing exhaust gas mass flow $dm_{EGR}$. This provides robust debounced variables for cooler efficiency $\eta_{cooler\_debounced}$ and an exhaust gas mass flow $dm_{EGR\_debounced}$ that is consistent with them. These are used in the adaptation model for adapting the cooler efficiency ηcooler. Furthermore, the comparison in the additional comparator unit 16 is able to determine an error if efficiency $\eta_{cooler\_debounced}$ of EGR cooler 8 falls below a certain efficiency threshold value WGS.

In this exemplary embodiment, efficiency threshold value WGS is not constant, but is a function of mass flow $dm_{EGR}$. Efficiency threshold value WGS is calculated from an efficiency threshold value offset WGSoff and a variable value that results from a characteristics map 34.

Figure 5:
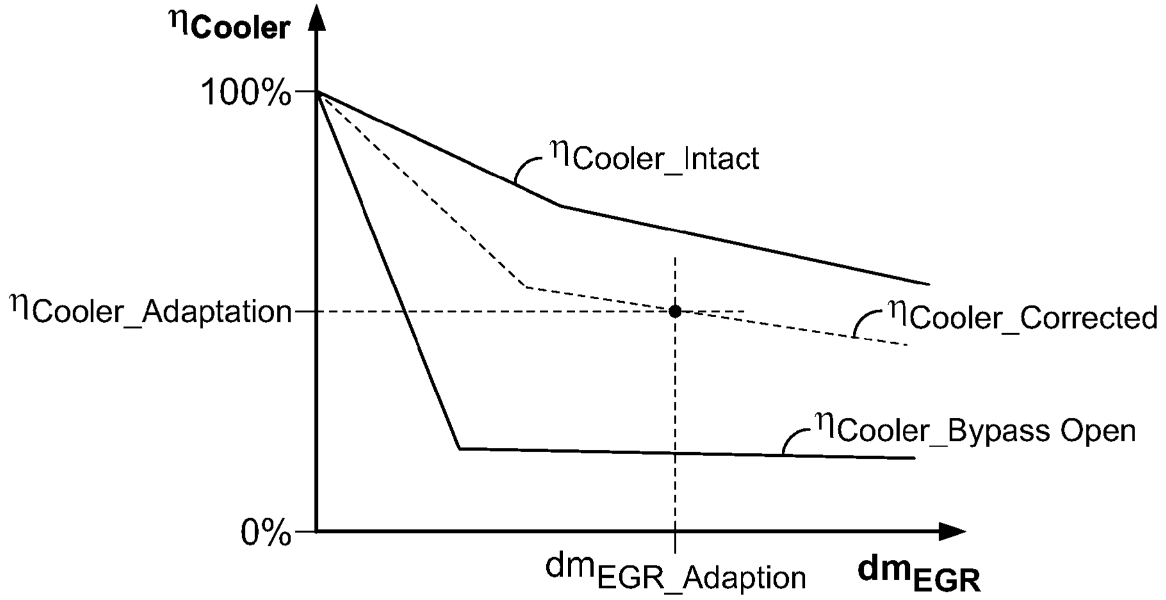
FIG. 5 is a representation of the dependence of the cooler efficiency on an EGR mass flow of the recirculated exhaust gas including an illustration of an estimation or interpolation of the existing efficiency at a certain EGR mass flow.

FIG. 5 shows characteristic curves of a cooler model for the efficiency $\eta_{cooler}$ of EGR cooler 8 as a function of exhaust gas mass flow $dm_{EGR}$ for an intact cooler (reference cooler) and efficiency $\eta_{cooler\_bypass\_open}$ for an EGR cooler 8 that is suppressed entirely with the aid of a bypass. The characteristic curves are usually ascertained by measurement at an engine test stand for an internal combustion engine 2.

In the representation of FIG. 5, a debounced efficiency $\eta_{cooler}$, which is calculated from the temperature specification of temperature detector 9 as previously described, is plotted in exemplary fashion against exhaust gas mass flow $dm_{EGR}$ within the two characteristic curves for the intact cooler and the suppressed EGR cooler 8. The plotted operating point $\eta_{cooler\_adaptation}$, $dm_{EGR\_adaptation}$ indicates the current cooler behavior or its performance. In order to be able to infer from this operating point the adapted characteristic curve of EGR cooler 8 as a function of exhaust gas mass flow $dm_{EGR}$, the values for each value of the exhaust gas mass flow are interpolated between the characteristic curves for $\eta_{cooler\_intact}$ und $\eta_{cooler\_bypass\_open}$ such that the dashed characteristic curve for $\eta_{cooler\_corrected}$ results. The interpolation may be performed, for example, in that for each value of exhaust gas mass flow $dm_{EGR}$ the distance between the efficiencies for $\eta_{cooler\_intact}$ and $\eta_{cooler\_bypass\_open}$ is divided into a ratio in which the correction value of the efficiency $\eta_{cooler\_adaptation}$ divides the distance between efficiencies for $\eta_{cooler\_intact}$ and $\eta_{cooler\_bypass\_open}$ at point $dm_{EGR\_adaptation}$. The following applies:

$$\alpha = \frac{\left(\begin{array}{l}\eta_{cooler\_adaptation}(dm_{EGR\_adaptation} - \\ \eta_{cooler\_bypass\_open}(dm_{EGR\_adaptation})\end{array}\right)}{\left(\begin{array}{l}\eta_{cooler_{intact}}(dm_{EGR\_adaptation}) - \\ \eta_{cooler\_bypass\_open}(dm_{EGR\_adaptation})\end{array}\right)}$$

$$\eta_{cooler\_corrected}(dm_{EGR}) = \alpha \cdot \left(\begin{array}{l}\eta_{cooler\_intact}(dm_{EGR}) - \\ \eta_{cooler\_bypass\_open}(dm_{EGR})\end{array}\right)$$

This interpolation may be performed for example in a control unit of internal combustion engine 3.

When ascertaining the corrected characteristic curve it is sensible to limit the adaptation. For example, the adaptation should be performed in limited adjustable step sizes in order to increase the robustness of the adaptation method. For example, if the currently valid characteristic curve for the corrected cooler efficiency $\eta_{cooler\_corrected}$ lies above the calculated operating point $\eta_{cooler}$, $dm_{EGR}$, then for example the characteristic curve (i.e. all values of the efficiencies $\eta_{cooler}$) may be adapted by a defined percentage of the absolute value of the efficiency or of the differential value of the efficiencies $\eta_{cooler\_intact}$ for the intact cooler and the efficiency $\eta_{cooler\_bypass\_open}$ for the bypassed cooler.

Efficiency threshold value WGS is now determined as the sum of constant efficiency threshold value offset WGSoff and an efficiency differential value $\Delta\eta$ ascertained from a characteristics map 34, which is provided as a function of exhaust gas mass flow $dm_{EGR\_debounced}$. The efficiency threshold value WGS dependent on exhaust gas mass flow $dm_{EGR\_debounced}$, makes it possible to increase the robustness of monitoring in that the dependent efficiency threshold value is increased in the direction of smaller EGR mass flows corresponding to efficiency characteristic curve $\eta_{cooler\_corrected}$.

FIG. 5 schematically shows the adaptation of cooler efficiency $\eta_{cooler}$ with the aid of the corrected efficiency characteristic curve, which is shown in exemplary fashion as the dashed efficiency characteristic curve in FIG. 5. The adaptation of temperature $T_{EGR}$ is performed with the aid of corrected cooler efficiency $\eta_{cooler\_corrected}$, which results from the characteristic curve of FIG. 5, and the exhaust gas temperature T3 and cooling water temperature $T_{cooling}$ water. The following applies:

$$T_{EGR\_adapted}=T_3-\eta_{cooler\_corrected}(T_3-T_{cooling\ water})$$

If the corrected efficiency characteristic curve is available, it may be used to calculate, in the air system model using the same algorithms as before, for an intact cooler, the adapted temperature $T_{EGR\_adapted}$ for the current real cooler state, which has very good dynamics as contrasted with the temperature specification of temperature detector 9 that is provided with a lag.

What is claimed is:

1. A method for providing a specification about an efficiency of a cooler for recirculated exhaust gas in an internal combustion engine, comprising:

measuring, at a temperature detector, a temperature of the recirculated exhaust gas cooled by the cooler;

obtaining a temperature of exhaust gas leaving the internal combustion engine;

obtaining a temperature of cooling water flowing through the cooler;

obtaining a modeled temperature of the recirculated exhaust gas from a computer-executed cooler model that calculates and outputs the modeled temperature of the recirculated exhaust gas as a function of an efficiency value of a reference cooler;

calculating one of an absolute value of the cooler efficiency and a change in the cooler efficiency relative to an efficiency of the reference cooler, wherein the calculating is performed as a function of (i) the measured temperature of the recirculated exhaust gas, (ii) the temperature of the exhaust gas leaving the engine, and (iii) the cooling water temperature; and adjusting the modeled temperature of the recirculated exhaust gas as a function of the calculated one of the absolute value of the cooler efficiency and the change in the cooler efficiency efficiency.

2. The method according to claim 1, further comprising:

obtaining a mass flow value of the recirculated exhaust gas; and inputting the mass flow value into the cooler model, wherein the cooler model calculates and outputs the modeled temperature of the recirculated exhaust gas as a function of the mass flow value.

3. The method according to claim 1, wherein the calculated one of the absolute value of the cooler efficiency and the change in the cooler efficiency is low-pass filtered.

4. The method according to claim 3, wherein a time constant of the low-pass filtering is performed as a function of an enabling time, the enabling time indicating a total time during which at least one enabling condition is satisfied.

5. The method according to claim 1, wherein the calculating and the adjusting are only performed when at least one of the following enabling (a) the exhaust gas temperature exceeding a certain predetermined exhaust gas threshold temperature;

(b) an exhaust gas mass flow of the recirculated exhaust gas exceeding a certain predetermined exhaust gas mass flow threshold value; and (c) the EGR rate exceeding a certain predetermined EGR rate threshold value.

6. The method of claim 1, further comprising:

when the change in the cooler efficiency is calculated:

comparing the change in the cooler efficiency to a predetermined threshold value corresponding to a maximum allowable change in efficiency; and determining that the cooler is experiencing a failure when the change in the cooler efficiency exceeds the predetermined threshold value.

7. The method according to claim 1, further comprising when the absolute value of the cooler efficiency is calculated:

calculating a dynamic threshold value corresponding to a minimum required efficiency by:

obtaining an efficiency differential value from a characteristics map as a function of a mass flow value of the recirculated exhaust gas; and calculating the dynamic threshold value as a sum of the efficiency differential value and a constant offset value;

comparing the absolute value of the cooler efficiency to the dynamic threshold value; and determining that the cooler is experiencing a failure when the absolute value of the cooler efficiency is below the dynamic threshold value.

8. The method according to claim 7, wherein the modeled temperature of the recirculated exhaust gas is adjusted as a function of an ascertained efficiency of the cooler, which is determined based on a value of the exhaust gas mass flow at a current operating point of the cooler.

9. The method according to claim 7, wherein the modeled temperature of the recirculated exhaust gas is adjusted as a function of an efficiency value obtained from a corrected characteristic curve, which is generated by interpolating between a characteristic curve of the reference cooler and a characteristic curve of a suppressed cooler at a plurality of points corresponding to different exhaust gas mass flow values.

10. The method of claim 1, further comprising:

setting, by an engine control system, an exhaust gas recirculation rate for the internal combustion engine as a function of the adjusted modeled temperature of the recirculated exhaust gas.

11. The method of claim 1, wherein the change in cooler efficiency is calculated as $$\Delta\eta_{cooler}=\frac{T_{EGR}-T_{EGRmodel}}{T_3-T_{coling\ water}},$$

where $\Delta\eta_{cooler}$ is the change in cooler efficiency, $T_{EGR}$ is the measured temperature of the recirculated exhaust gas, $T_3$ is the temperature of the exhaust gas leaving the engine, $T_{cooling\ water}$ is the cooling water temperature, and $T_{EGRmodel}$ is the modeled temperature of the recirculated exhaust gas.

12. The method of claim 1, wherein the modeled temperature of the recirculated exhaust gas is adjusted by adding the term $\Delta\eta*(T_3-T_{cooling\ water})$, where $\Delta\eta$ is the change in cooler efficiency, $T_3$ is the temperature of the exhaust gas leaving the engine, and $T_{cooling\ water}$ is the cooling water temperature.

13. The method of claim 1, wherein the absolute value of the efficiency is calculated as $$\Delta\eta_{cooler} = \frac{T_3 - T_{EGR}}{T_3 - T_{coling\ water}},$$

where $\eta_{cooler}$ is the absolute value of the efficiency, $T_{EGR}$ is the measured temperature of the recirculated exhaust gas, $T_3$ is the temperature of the exhaust gas leaving the engine, and $T_{cooling\ water}$ is the cooling water temperature.

14. The method of claim 13, wherein the adjusted modeled temperature of the recirculated exhaust gas is calculated as $T_3 - \eta_{cooler\_corrected}(T_3 - T_{cooling\ water})$, where:

$\eta_{cooler\_corrected}$ is an efficiency value corresponding to a current operating point of the cooler and is obtained from a corrected characteristic curve in which efficiency values are plotted against exhaust gas mass flow values;

the corrected characteristic curve is generated by interpolating between a characteristic curve of the reference cooler and a characteristic curve of a suppressed cooler at a plurality of points corresponding to different exhaust gas mass flow values; and non-interpolated points along the corrected characteristic curve are obtained by plotting measured exhaust gas mass flow values against corresponding calculated $\eta_{cooler}$ values.

15. A system, comprising:

an engine control unit in an internal combustion engine, the engine control unit that performs the following obtaining a measurement, from a temperature detector, of a temperature of the recirculated exhaust gas cooled by the cooler;

obtaining a temperature of exhaust gas leaving the internal combustion engine;

obtaining a temperature of cooling water flowing through the cooler;

obtaining a modeled temperature of the recirculated exhaust gas from a computer-executed cooler model that calculates and outputs the modeled temperature of the recirculated exhaust gas as a function of an efficiency value of a reference cooler;

calculating one of an absolute value of the cooler efficiency and a change in the cooler efficiency relative to an efficiency of the reference cooler, wherein the calculating is performed as a function of (i) the measured temperature of the recirculated exhaust gas, (ii) the temperature of the exhaust gas leaving the engine, and (iii) the cooling water temperature; and adjusting the modeled temperature of the recirculated exhaust gas as a function of the calculated one of the absolute value of the cooler efficiency and the change in the cooler efficiency.

16. The system according to claim 15, wherein the internal combustion engine includes a recirculation line adapted to recirculate exhaust gas in an air system of the internal combustion engine.

17. The system according to claim 15, wherein the engine control unit is adapted to:

when the change in the cooler efficiency is calculated:

compare the change in the cooler efficiency to a predetermined threshold value corresponding to a maximum allowable change in efficiency; and determine that the cooler is experiencing a failure when the change in the cooler efficiency exceeds the predetermined threshold value; and when the absolute value of the cooler efficiency is calculated:

calculate a dynamic threshold value corresponding to a minimum required efficiency by:

obtaining an efficiency differential value from a characteristics map as a function of a mass flow value of the recirculated exhaust gas; and calculating the dynamic threshold value as a sum of the efficiency differential value and a constant offset value;

compare the absolute value of the cooler efficiency to the dynamic threshold value; and determine that the cooler is experiencing a failure when the absolute value of the cooler efficiency is below the dynamic threshold value.

18. The system according to claim 17, further comprising an internal combustion engine including a recirculation line adapted to recirculate exhaust gas in an air system of the internal combustion engine.

19. A method for providing a specification about an efficiency of a cooler for recirculated exhaust gas in an internal combustion engine, comprising:

measuring, at a temperature detector, a temperature of the recirculated exhaust gas cooled by the cooler;

obtaining a temperature of exhaust gas leaving the internal combustion engine;

obtaining a temperature of cooling water flowing through the cooler;

obtaining a modeled temperature of the recirculated exhaust gas from a computer-executed cooler model that calculates and outputs the modeled temperature of the recirculated exhaust gas as a function of an efficiency value of a reference cooler; and calculating one of an absolute value of the cooler efficiency and a change in the cooler efficiency relative to an efficiency of the reference cooler, wherein the calculating is performed as a function of (i) the measured temperature of the recirculated exhaust gas, (ii) the temperature of the exhaust gas leaving the engine, and (iii) the cooling water temperature;

when the change in the cooler efficiency is calculated:

comparing the change in the cooler efficiency to a predetermined threshold value corresponding to a maximum allowable change in efficiency; and determining that the cooler is experiencing a failure when the change in the cooler efficiency exceeds the predetermined threshold value.

* * * * *